(12) United States Patent
Lambrache et al.

(10) Patent No.: US 7,082,481 B2
(45) Date of Patent: Jul. 25, 2006

(54) SERIAL PERIPHERAL INTERFACE (SPI) APPARATUS WITH WRITE BUFFER FOR IMPROVING DATA THROUGHPUT

(75) Inventors: Emil Lambrache, Campbell, CA (US); Benjamin F. Froemming, Campbell, CA (US)

(73) Assignee: Atmel Corporation, San Jose, CA (US)

( * ) Notice: Subject to any disclaimer, the term of this patent is extended or adjusted under 35 U.S.C. 154(b) by 245 days.

(21) Appl. No.: 10/722,819

(22) Filed: Nov. 25, 2003

(65) Prior Publication Data

US 2005/0114567 A1 May 26, 2005

(51) Int. Cl.
G06F 3/00 (2006.01)
G06F 13/12 (2006.01)

(52) U.S. Cl. .......................................... 710/52; 710/72
(58) Field of Classification Search ................. 710/33, 710/34, 52, 57, 72
See application file for complete search history.

(56) References Cited

U.S. PATENT DOCUMENTS

| | | | |
|---|---|---|---|
| 4,527,236 A * | 7/1985 | Ermolovich ................. 714/56 |
| 4,816,996 A | 3/1989 | Hill et al. ..................... 364/200 |
| 4,885,538 A * | 12/1989 | Hoenniger et al. .......... 324/312 |
| 4,958,277 A | 9/1990 | Hill et al. ..................... 364/200 |
| 5,805,922 A | 9/1998 | Sim et al. .................... 395/825 |
| 6,516,366 B1 | 2/2003 | Gates et al. ................. 710/105 |
| 2002/0010882 A1 * | 1/2002 | Yamashita .................... 714/45 |
| 2002/0133646 A1 | 9/2002 | Cheung et al. .............. 710/22 |
| 2002/0133662 A1 | 9/2002 | Cheung ....................... 710/310 |
| 2004/0243744 A1 | 12/2004 | Smith et al. .................. 710/52 |

OTHER PUBLICATIONS

Copy of Section 8 "Synchronous Serial Peripheral Interface", pp. 291-316, of Motorola, "M68HC11" Reference Manual, Rev. 6, Apr. 2002.

* cited by examiner

*Primary Examiner*—Fritz Fleming
*Assistant Examiner*—David Martinez
(74) *Attorney, Agent, or Firm*—Schneck & Schneck; Thomas Schneck (57) ABSTRACT

A serial peripheral interface apparatus has a second parallel write buffer to load in a subsequent data byte while a current data byte is being transferred serially through the apparatus instead of waiting for the previous data byte to complete the serial transfer and other commands to avoid write collision. The subsequent data byte is transferred into the second parallel write buffer only after the software driven CPU examines the status of a load enable and the status of a write buffer provided by a finite state machine controller. The software driven CPU orders the subsequent data byte to be transferred into the second parallel write buffer when the load enable is favorable and the second parallel write buffer is available. The load enable becomes favorable when a bit counter counts the first half of the transfer of the previous data set. Thus, the second parallel write buffer avoids the stretching the master clock and improves data throughput of the system.

15 Claims, 12 Drawing Sheets

Fig._6C

SERIAL PERIPHERAL INTERFACE (SPI) APPARATUS WITH WRITE BUFFER FOR IMPROVING DATA THROUGHPUT

TECHNICAL FIELD

This invention relates generally to a serial peripheral interface. More specifically, this invention relates to write collision avoidance for improving data throughput of a serial peripheral interface.

BACKGROUND ART

The serial peripheral interface (SPI) is one of two independent serial communications subsystems included on the Motorola MC68HC11A8 microcontroller. As the name implies, the SPI is primarily used to allow a microcontroller unit (MCU) to communicate with peripheral devices. The central element in the Motorola serial peripheral interface system is a block containing the shift register and the read data buffer. The system is single buffered in the transmit direction and double buffered in the receive direction. This fact means that a subsequent data byte for transmission cannot be written to the shifter until the current data byte transmission is complete; however, received data is transferred into a parallel read data buffer so the shifter is free to accept a second serial character. As long as the first character is read out of the read data buffer before the next serial character is ready to be transferred, no write collision condition will occur.

A write collision occurs if a data register is written while a transfer is in progress. Since the data register is not double buffered in the transmit direction, writes to data register cause data to be written directly into the SPI shift register. Because this write corrupts any transfer in progress, a write-collision error is generated. The transfer continues undisturbed, and the write data that caused error is not written to the shifter. The write collision avoidance in the Motorola SPI causes a degradation in the data throughput. The software driver has to pinpoint the exact moment when to request a new data byte transmission. The software driver is located at the CPU level and overlooks all the write collision problems of all master-slave registers in the MCU-to-MCU communications. The software driver is not located at each local SPI, and therefore it takes time and sacrifices in the data throughput of the system.

Figure 1:
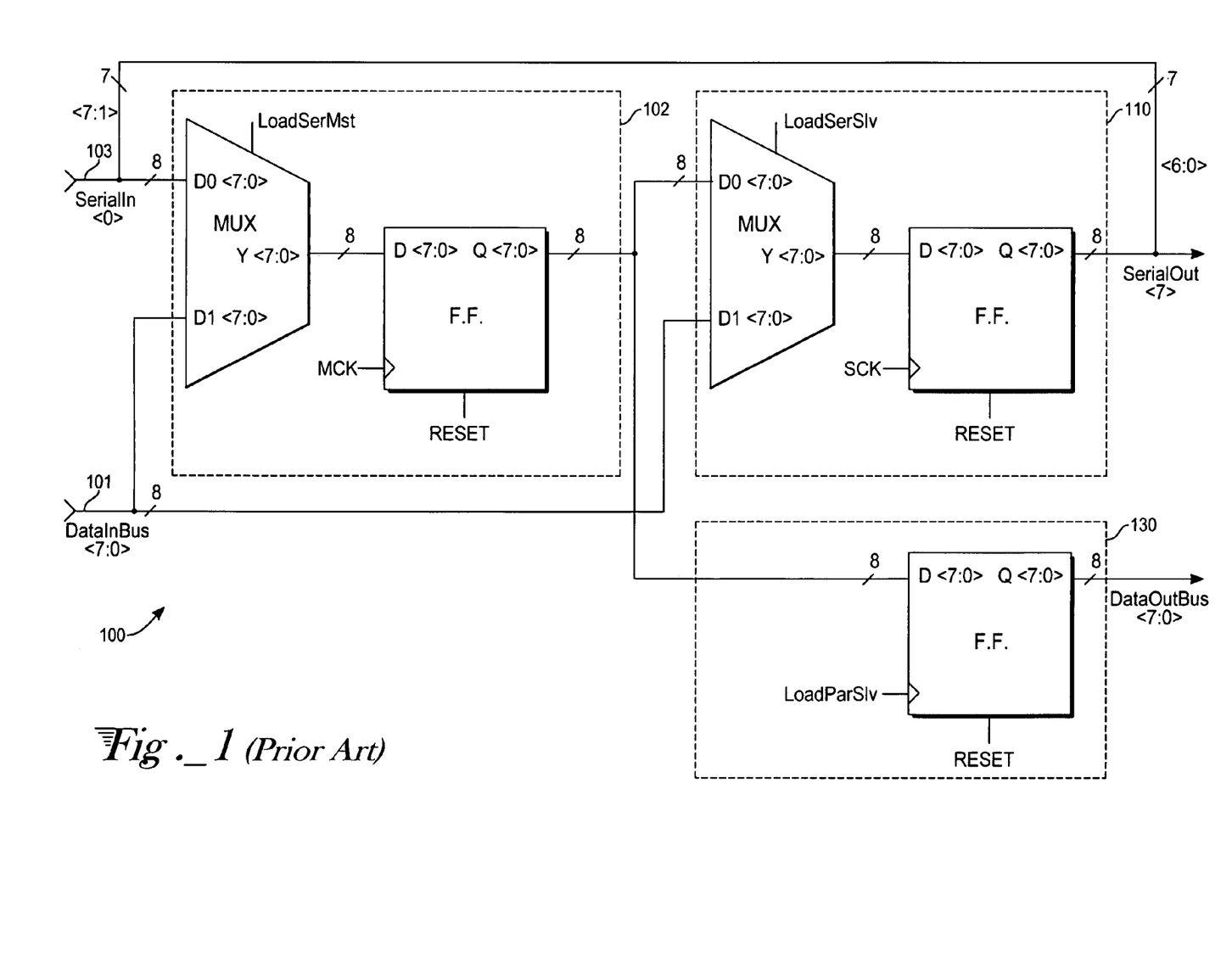
FIG. 1 illustrates a detailed block diagram of a prior art serial peripheral interface.

FIG. 1 illustrates a schematic diagram of representative prior art SPI circuitry. The SPI subsystem 100 includes a serial master shift register 102, a serial slave shift register 110, and a parallel slave shift register 130. One problem inherent to such circuitry requires the software driver to wait for a current data byte transmission to complete and for other necessary control commands in order to avoid write collision.

Parallel data from the CPU (not shown) are loaded into a data input bus 101 DataInBus and into the serial slave shift register 110. Serial data are first shifted into the master shift register 102 when the master clock goes HIGH. As serial data is shifted serially from the serial master register 102 into the serial slave register 110, the previous parallel data from the CPU and data input bus 101 DataInBus is left shifted by one bit and into the serial master register 102. Only after all the data are shifted from the serial input 103 into the serial master register 102, and after previous data are shifted from the serial slave register 110 back to the serial master register 102, the subsequent data from the CPU are loaded in a parallel fashion into the serial slave register 110.

A software driver (not shown) at the CPU monitors closely these data transmissions in order to avoid data corruption.

The SPI 100 also has a software driver (not shown), a bit counter to track the status of the SPI's transmission, and a finite state machine (FSM) controller to provide load control signals to the SPI, communicate "receive ready" signals to the CPU and report any write collision errors.

Write collision happens when the SPI 100 has not finished transmitting the current data byte from the serial master register 102 into the serial slave register 110, and the subsequent data byte has already transmitted into the serial slave register 110. In order to prevent write collision, the software driver must know when the current data byte is completely transmitted and wait for other control commands such as the write collision signal, receive save signal, receive ready signal, in order to allow the transmission of the subsequent data byte. Consequently, the clock signal is stretched out and the data throughput of the SPI 100 suffers.

There are attempts to resolve this primary drawback of a serial peripheral interface apparatus. One such attempt is disclosed in the U.S. patent application Ser. No. 4,816,996, entitled "Queued Serial Peripheral Interface for Use in Data Processing System" by Susan C. Hill et al. (hereinafter "The '996 patent). In the '996 patent, the improved serial peripheral interface reduces the amount of intervention required on the part of the controlling data processing device by using a memory means with queue pointer and data serializer coupled to master slave input/output buffers. The memory means store both received data, data to be transmitted, commands for each serial transfer. Each serial transfer is executed in accordance to a command specific to such transfer. The command alters the queue pointer to fit to such particular data byte and to improve the efficiency of the transfer, thus reducing the intervention from the controller to each data transfer. In other words, the serial peripheral interface of the '996 patent includes a memory means, a serializer, a command/control, a queue pointer, and input/output buffers to improve th serial transfer. The end result is that when the serial transfer is efficient, there is less intervention of the controller to accomplish a given data transfer.

There is a need for a simple, cost effective improvement of the throughput of the serial peripheral interface apparatus.

SUMMARY OF THE INVENTION

Accordingly, this object of the invention is achieved by a serial peripheral interface apparatus that uses a second parallel write buffer to enable a control processing unit (CPU) to load in a subsequent data byte while a current data byte is being transferred serially from a first write buffer through the apparatus. The serial peripheral interface with two parallel write buffers does not have to wait for the previous data byte to complete the serial transfer and other control commands to avoid data collision and the transfer of a subsequent data byte. The second parallel write buffer releases the burden for the software driver, since the software driver does not have to monitor a master-slave register for the completion of a current data byte transmission before loading a subsequent byte for transmission without data collision. Thus, a state machine and a second write buffer are at the gate level and effectively simplify the monitoring function of the software driver by providing an early "load enable" signal to the software driver.

The subsequent data byte is transferred into the second parallel write buffer only after a finite state machine controller examines two signals: the status of the primary write buffer and the status of the second parallel write buffer.

Afterwards, the state machine controller orders the subsequent data byte to be transferred from the second parallel write buffer into the primary write buffer when the load enable is favorable and the write buffer is available. The load enable is favorable for the second write buffer when a bit counter counts the first half of the serial transfer of the previous data byte (which occupies the primary write buffer) instead of waiting for the complete serial transfer and other control commands. Thus, the second parallel write buffer avoids stretching the master clock and inherently improves data throughput without using complex and costly external devices.

BRIEF DESCRIPTION OF THE DRAWINGS

FIG. 3 (shown in two parts 3A and 3B) illustrates timing diagrams of an enhanced serial peripheral interface with a double write buffer to improve throughput in accordance with the present invention.

PREFERRED EMBODIMENT OF THE DESCRIPTION

Figure 2A:
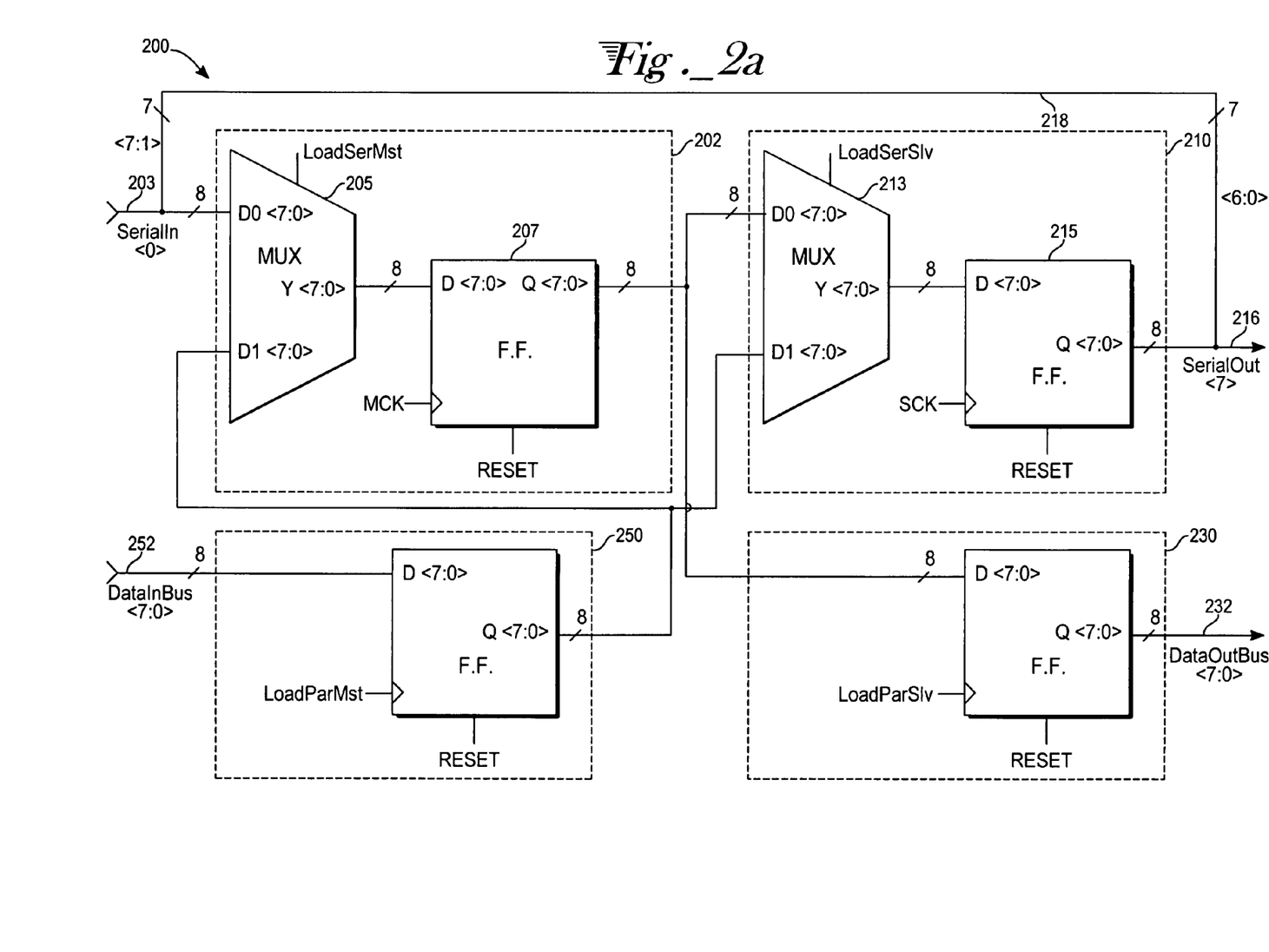
FIGS. 2A and 2B illustrate a block diagram of an enhanced serial peripheral interface (FIG. 2A) with a double write buffer in accordance with the present invention, and its associated finite state machine controller (FIG. 2B).

With reference to FIG. 2A, an exemplary embodiment of the new enhanced mode SPI 200 block diagram contains a new register latch serving as a second parallel write buffer 250. Its purpose is to accept the content of input data on the parallel input data bus DataInBus 252 and store it while a previous data byte is still being transmitted. The enhanced SPI 200 comprises a serial master register 202, a serial slave register 210, a parallel slave register 230, and the second parallel write buffer 250.

The serial registers 202 and 210 are coupled together for transferring data serially through a serial output SerialOut 216. (Data can also be received serially through a serial input SerialIn 203 and converted by the serial registers into a parallel output for the bus DataOutBus 232.) The output of the master register 202 is coupled to the input of the slave register 210, while the output of the slave register 210 is coupled to both the serial output SerialOut 216 and a feedback bus 218 leading to an input of the master register 202. Both of the serial registers 202 and 210 preferably comprise a multiplexer 205 and 213 coupled to a clocked flip-flop 207 or 215 (or other latching circuit). The parallel slave register 230 and the parallel master register 250 that serves as a write buffer preferably comprise a clocked flip-flop or other latching circuit. All of the register elements are typically byte wide, including their connections, except for the feedback bus 218, which is only 7 bits wide and shifts the slave register outputs <6:0> to master register inputs <7:1>, thus forming a serial shift register. Load control signals LoadParMst, LoadSerMst, LoadSerSlv and LoadParSlv, are applied to control inputs of the serial registers' multiplexers 205 and 213 (which then select inputs D1 from the output of write buffer 250) and to register clock inputs of the parallel registers 230 and 250, as indicated in FIG. 2A. The flip-flops 207 and 215 are latched by respective master and slave clock signals MCK and SCK.

In addition to the SPI shift register circuitry 200 (FIG. 2A), there is a finite state machine (FSM) controller 260 (FIG. 2B) which is different from the prior art's finite state machine controller. In the SPI 200, the finite state machine (FSM) controller 260 replaces the software driver of the prior art to monitor the data transmission. The finite state machine controller 260 uses a Transmit Buffer Full (TxBufFull) and Load Enable (LDEN) to signal a loading of a subsequent data byte into the second parallel write buffer 250. The FSM controller 260 also provides the load control signals for the SPI 200.

Figure 2B:
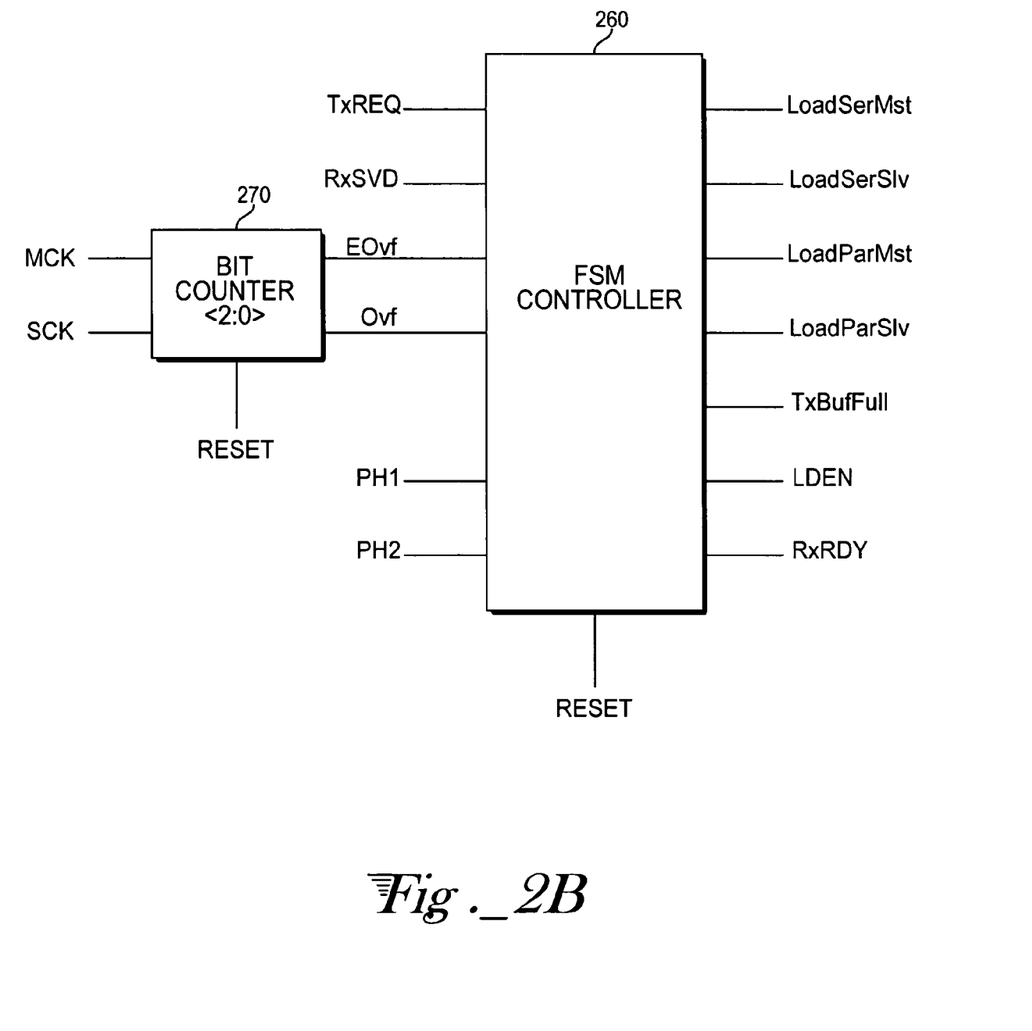

The serial peripheral interface apparatus 200 uses the second parallel write buffer 250 to store a subsequent data byte while a current data byte is being transferred serially therethrough. Hence, the serial peripheral interface apparatus 200 with the second parallel write buffer 250 does not have to wait for the current data byte to complete the serial transfer and other control commands to avoid write collision. The subsequent data byte is transferred into the second parallel write buffer 250 only after the CPU driven by the software driver examines two new signals: the status of a load enable (LDEN) and a status of the write buffer (TxBufFull) generated by the FSM 260. Afterwards, the software driven CPU orders the subsequent data byte to be transferred into the second parallel write buffer 250 when the load enable (LDEN) is favorable (high) and the parallel write buffer 250 is available (TxBufFull is low). The load enable is favorable while the bit counter 270 is counting the first half of the serial transfer of the previous data byte instead of waiting for the complete serial transfer and other write collision avoidance control commands. Thus, the write buffer 250 avoids having to stretch the master clock MCK and inherently improves data throughput of the SPI apparatus 200.

Figure 3A:
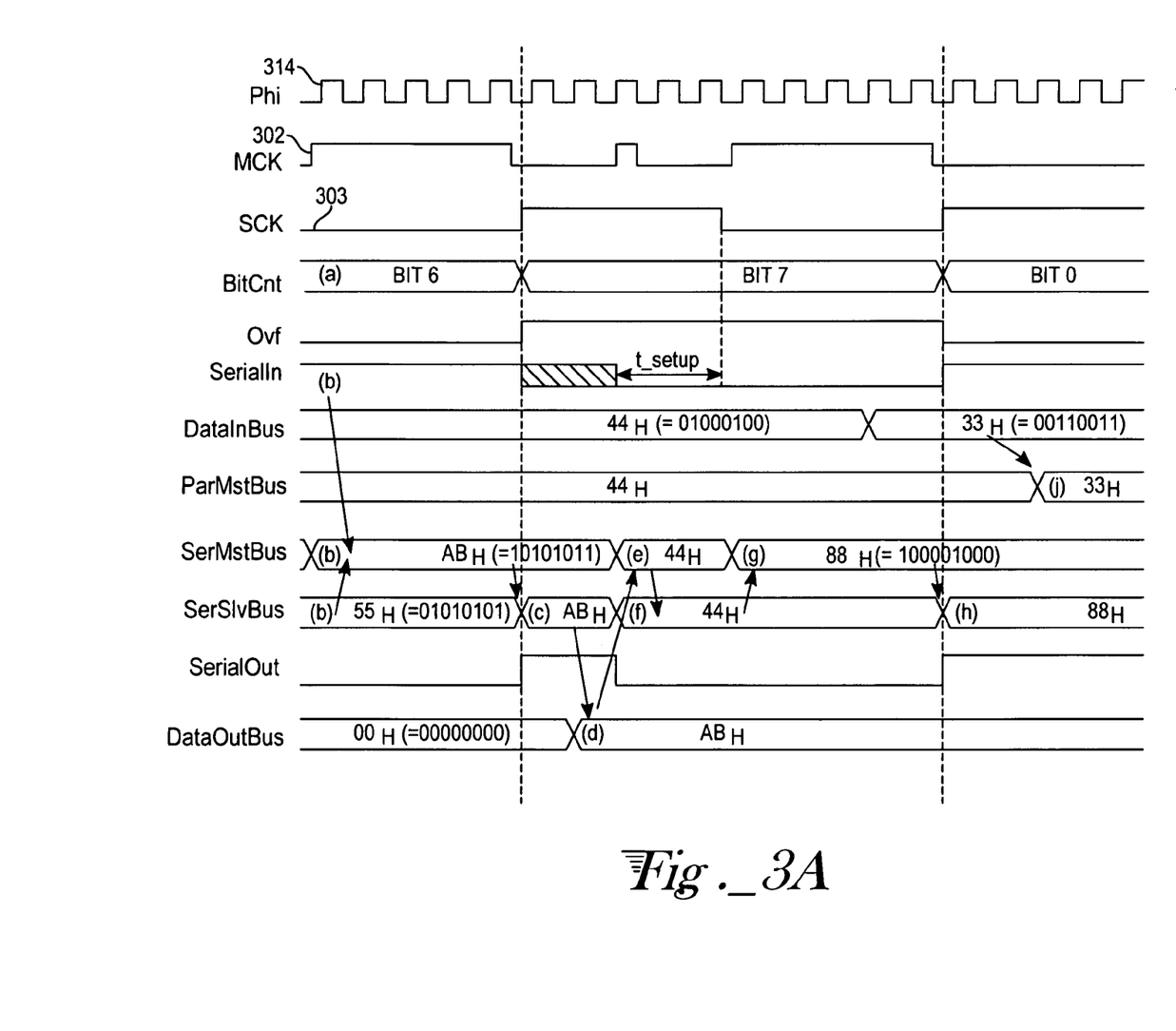
Figure 3B:
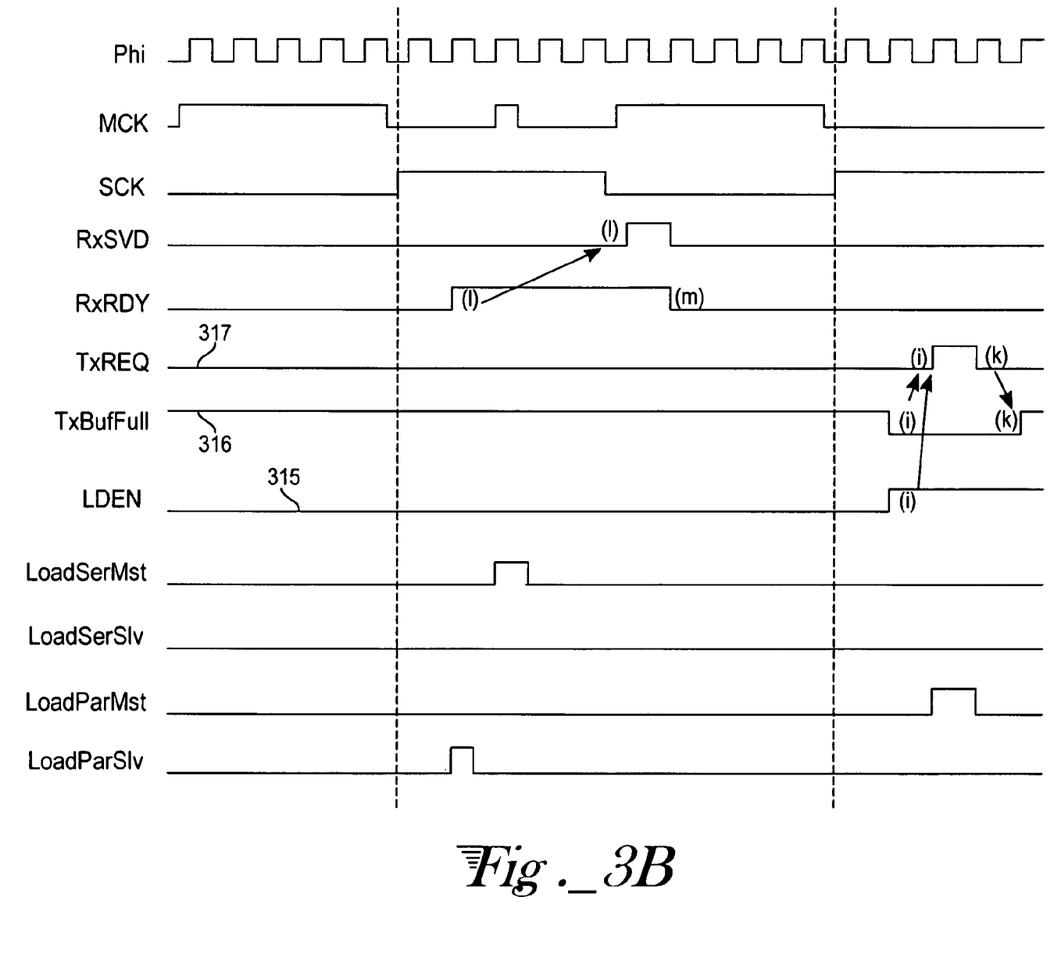

FIG. 3 (in two parts 3A and 3B) illustrates a timing diagram 300 that shows the manner in which the second parallel write buffer 250 avoids the stretching of the master clock MCK 302 and thus improves the data throughput. As discussed earlier, the stretching of the master clock (MCK) in the SPI 100 representative of the Motorola chip is caused by the software driver's waiting for completion of the transmission of the current data byte and other write collision avoidance commands.

The sequence of events a, b, c, and d represent the serial transfer of the current data byte. Because of the second parallel write buffer 250, the master clock 302 is not stretched. The signal ParMstBus represents the output of the parallel write buffer 250, the signal SerMstBus represents the output of the serial master register 202, and the signal SerSlvBus represents the output of the serial slave register 210, the most significant bit of which forms the serial output signal SerialOut and the other seven bits form the feedback to the serial master register.

Event j (loading write buffer 250) occurs during the time slot for bit 0. The loading of the second parallel write buffer 250 prompts the finite state machine controller 260 to set a status of the second write buffer 250 as a signal 316 TxBufFull. This signal 316 TxBufFull replaces other write collision avoidance signals of the prior art. The software driver should always check the signal 316 TxBufFull before attempting a new byte transmission to avoid write collision unless it is sweeping a transmission loop (see flow chart 500). This signal 316 TxBufFull would suffice for single byte transmissions in providing the necessary feedback to the software driven CPU. For establishing a continuous stream of data being received and transferred through the SPI 200 another signal, LDEN, needs to be generated by the FSM 260.

The loading of the parallel write buffer 250 into the serial slave register 210 is illustrated by the sequence of events e and f. Because a slave clock signal 303 SCK is continuously high at the time of the event e, a loading directly into the serial slave register 210 by the CPU would cause write collision. Rather, the CPU loads the subsequent data byte into the second parallel write buffer 250. The master clock 302 MCK is low outside the positive pulse on serial master loading signal 309 LoadSerMst. The link between the serial slave register 210 and serial master register 202 is closed at the time of the event e because the multiplexer of the serial master register 202 is accepting data from the write buffer 250 and because the load serial master signal 309 LoadSerMst is HIGH. Because the slave clock 303 SCK is high, the new data byte propagates immediately also into the serial slave register 210, designated by event f. It is clear that a new byte cannot be loaded into either the serial master register 202 or serial slave register 210 (events e and f) until event d has passed. Otherwise, the received byte would be lost. For this purpose a signal from the finite state machine controller 260 signals when it is safe to request a new byte transmission. This signal is the load enable 315 LDEN and is asserted during the transmission of serial data bits 0, 1, 2, and 3. The load enable 315 LDEN is low during bit slots 4, 5, 6, and 7. Even if the software driven CPU catches the load enable 315 LDEN high just before it is going LOW, three bit slots (4, 5, and 6) give enough time to the software driven CPU to update the input data 318 DataInBus and load parallel write buffer 250 by generating a transmit request signal 317 TxREQ pulse without running over bit slot 7. The serial clock frequency has to be sufficiently slower than a frequency of a host CPU system clock 314 Phi.

In conclusion, the software driven CPU tests the status of the write buffer 316 TxBufFull for LOW and the load enable 315 LDEN for HIGH before attempting a new byte transmission request by signal transmission request 317 TxREQ. These two new signals are included in the SPI Status Register (not shown). Because the software driver has plenty of time to load the next byte to be transmitted while the current byte is being transmitted, no stretching of the master clock 302 MCK or the slave clock 303 SCK occurs, therefore high data throughput is achieved.

Figure 4A:
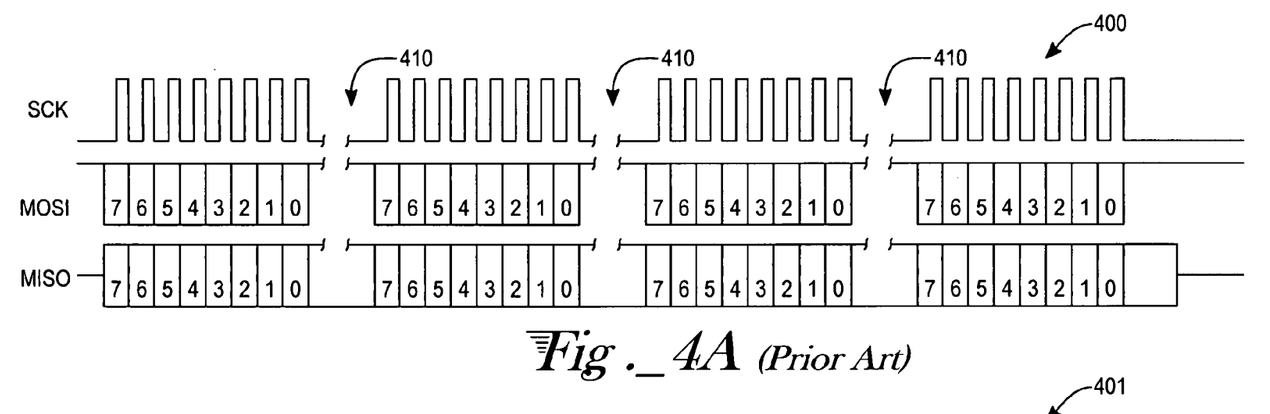
FIG. 4 illustrates a comparison between throughput performance of a prior art serial peripheral interface and a serial peripheral interface with a write buffer in accordance with the present invention.
Figure 4B:
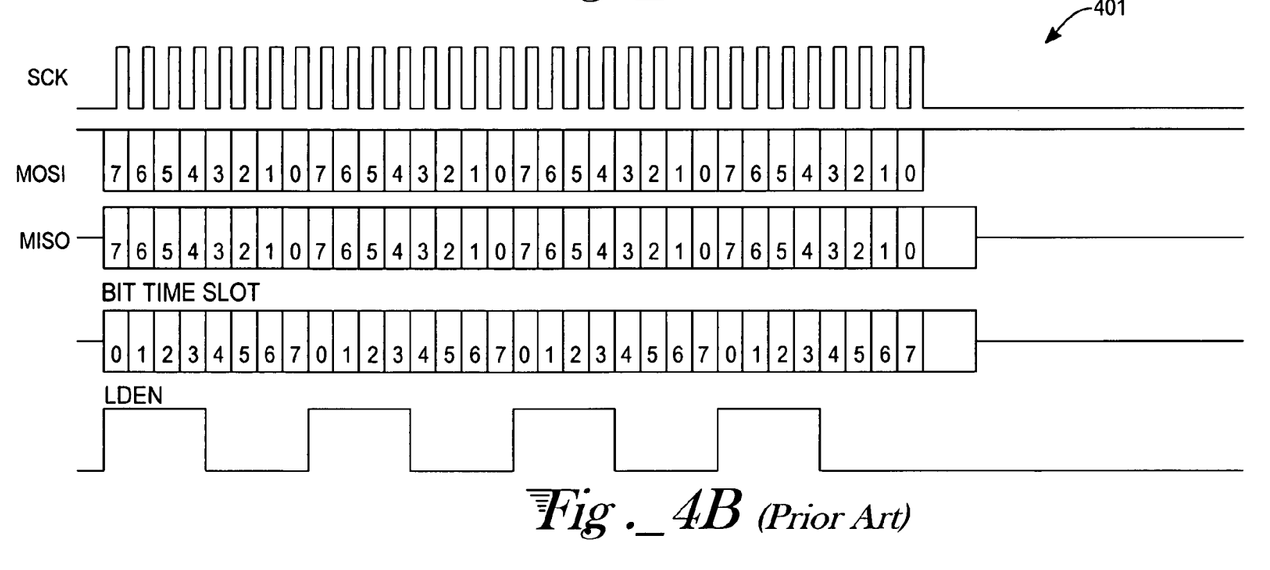

FIGS. 4A and 4B show timing diagrams 400 and 401 comparing the data transfers by a typical SPI 100 (FIG. 1) representative of the prior art and the SPI 200 (FIG. 2) in accordance with the present invention. The slave clock signal SCK, the data output from the serial master register MOSI and the data output from the serial slave register MISO are provided for comparison. The prior art data transfer seen in FIG. 4A reveals a plurality of gaps 410 between a previous data set and a subsequent data set. These gaps 410 are caused by extraneous CPU control commands and an associated wait for the current data byte to complete the serial transfer. The intervals 410 may be much larger, depending on the CPU and its baud rate. The slower the byte rate, the larger will be the gaps 410 and the lower the chance of a write collision. The faster the byte rate, the narrower will be the gaps 410, but the higher the chance of a write collision. In contrast, in the present invention the timing 404 of the slave clock SCK (and likewise the data outputs) shows no gap because the write buffer 250 allows the finite state machine controller 260 only to wait for a load enable signal 316 (LDEN) and the status of the write buffer 315 TxbuffFull.

Figure 5A:
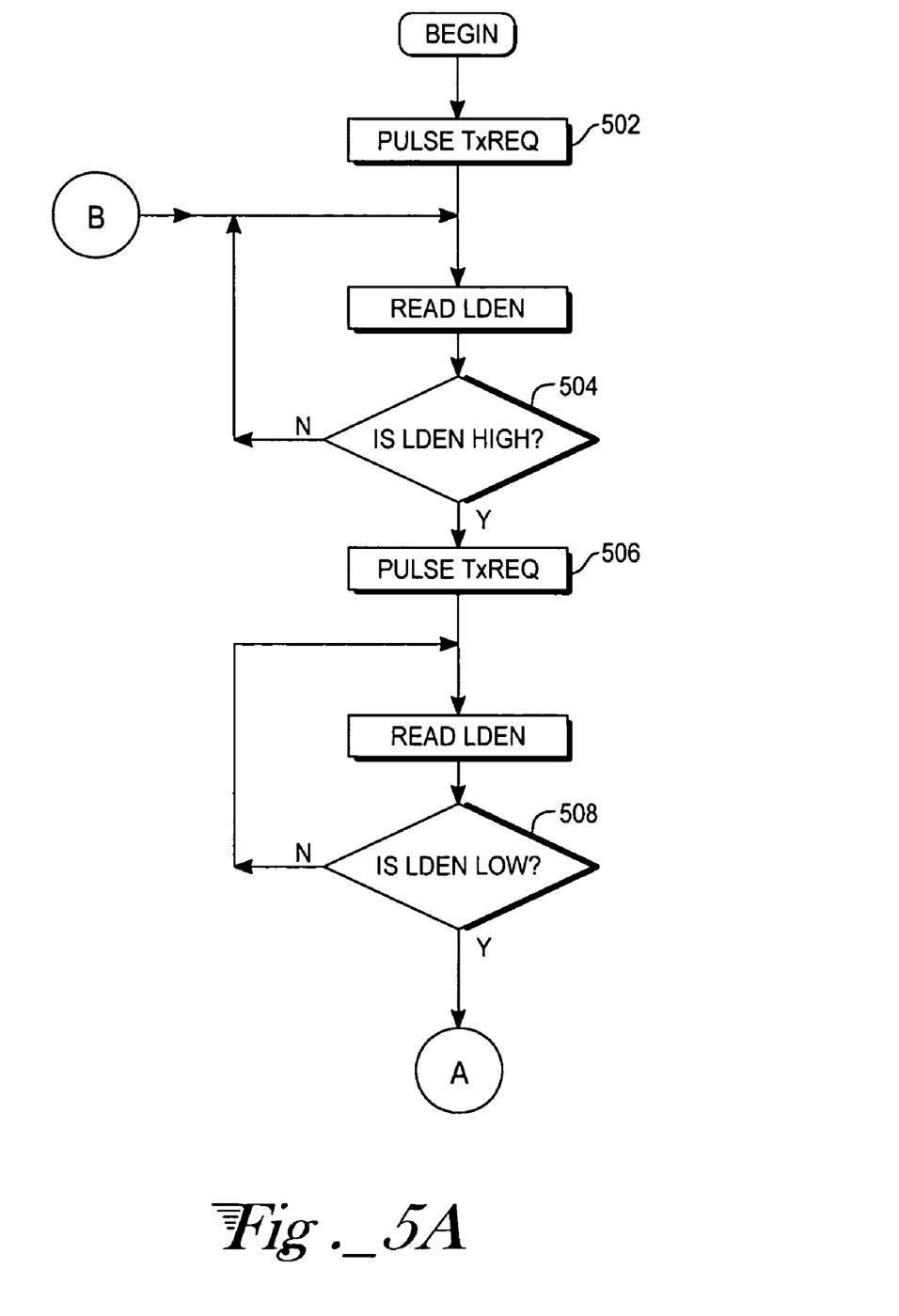
FIGS. 5A–5C illustrate a flow chart of a CPU software driver for improving data throughput using the write buffer in accordance with the present invention.
Figure 5B:
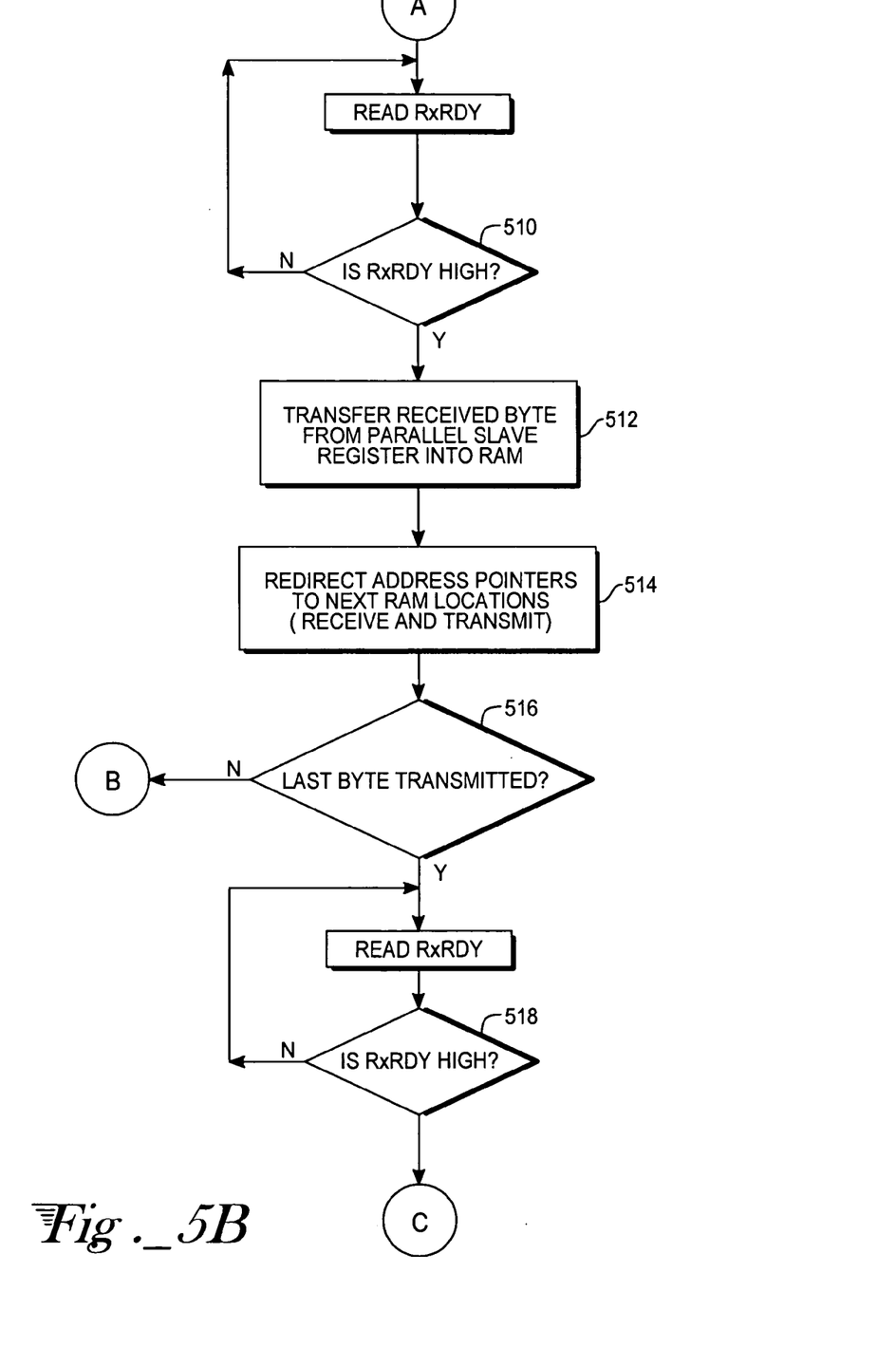
Figure 5C:
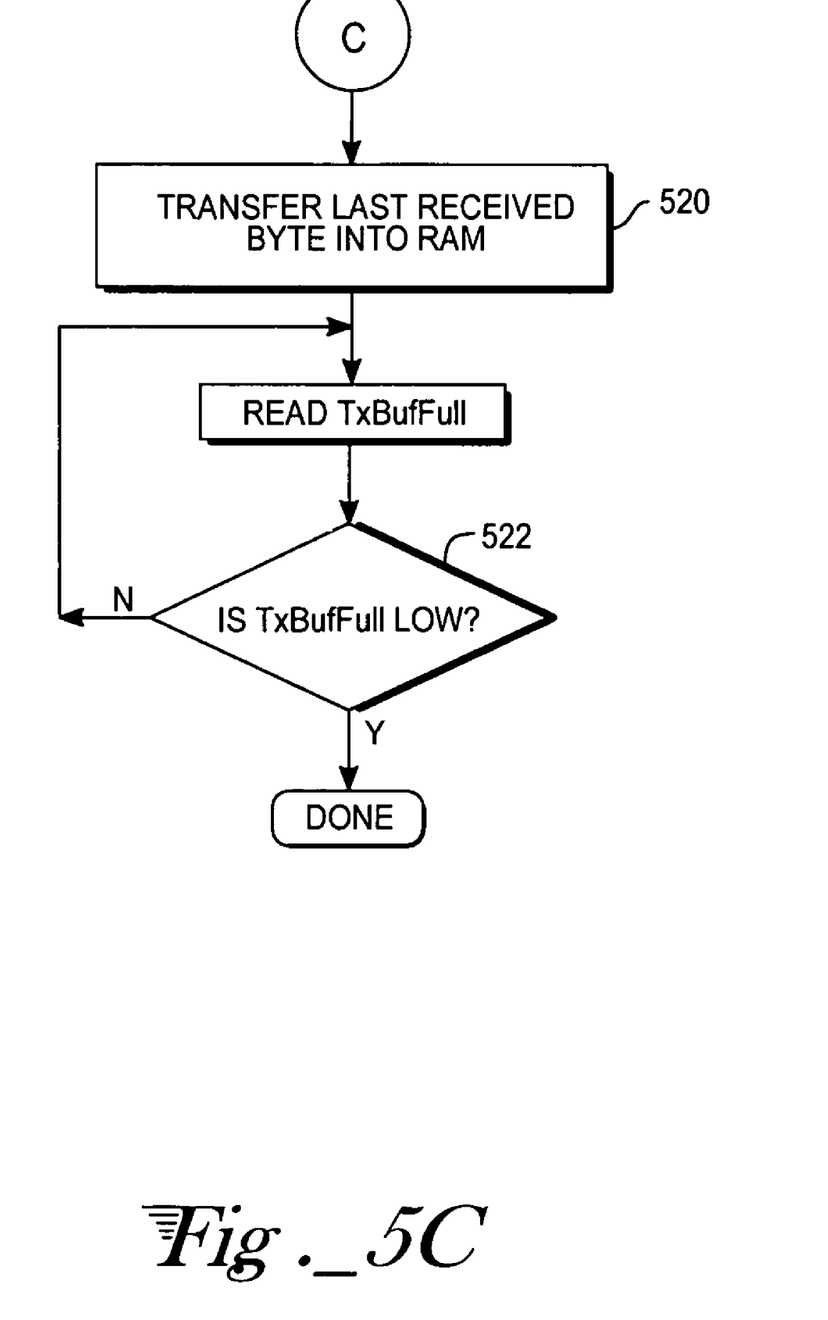

In another aspect of the present invention, a method for serially shifting data in a serial peripheral interface apparatus 200 (FIG. 4) is illustrated in FIGS. 5 and 6. FIGS. 5A–5C present the software driver flow chart.

Upon entering the SPI subroutine, a pulse of the transmit request signal TxREQ (step 502) causes the first byte of data to be transferred to load into the parallel master register (write buffer) 250 from the data input bus 252. The parallel master register 250 flushes immediately into one of the serial registers 202 or 210. The byte loads into the serial master register 202 in SPI modes 0 or 2. The byte loads into the serial slave register 210 in SPI modes 1 or 3.

The load enable signal LDEN is read from the SPI status register and checked to see whether or not it is high (step 504). If not, it will continue checking until LDEN is set high. When LDEN is high, another pulse of the signal TxREQ (step 506) loads the next byte of data from the data input bus 252 into the parallel master register 250. Just before LDEN went high again, TxBufFull was cleared at the end of the previous Bit 7 time slot. So if there is a new byte already in the parallel master register 250 during the previous Bit 7 time slot, testing of LDEN as high by the CPU is sufficient, so that also testing of TxBufFull as low becomes redundant. Still, after the last byte (when there is no new byte in the parallel master register 250) LDEN will not go high again because the SPI serial clock SCK will stop. Hence the CPU must test TxBufFull as low in order to detect completion of transmission of the last byte (see step 522).

After the loading of the next byte (step 506) into the parallel master register, TxBufFull is still high at this time. This software reads LDEN from the SPI status register and checks if LDEN is low (step 508) in order to know if the transmission is under way to avoid false re-triggering of TxREQ.

Next, the CPU reads the receive ready signal RxRDY from the SPI status register and checks whether or not RxRDY is high (step 510). If not, it will continue checking until RxRDY is set high. When RxRDY is high, a byte from the parallel slave register 230 is transferred via the data output bus 232 into RAM at a location specified by address pointers (step 512). Then the address pointers are redirected to the next RAM locations (next byte to be transmitted and/or next location for the next incoming byte). (step 514).

If that was not the last byte of data to be transmitted (step 516), then flow returns to checking LDEN (step 504). Otherwise, RxRDY is read from the SPI status register and checked to see whether or not it is high (step 518). If not, the CPU will continue checking until RxRDY is set high. When RxRDY is high, the last received byte is transferred (step 520) as with the previous bytes into the RAM at the current address indicated by the address pointers. Then TxBufFull is read and checked (step 522) until it has been reset to low. The SPI driver subroutine is then done.

Figure 6A:
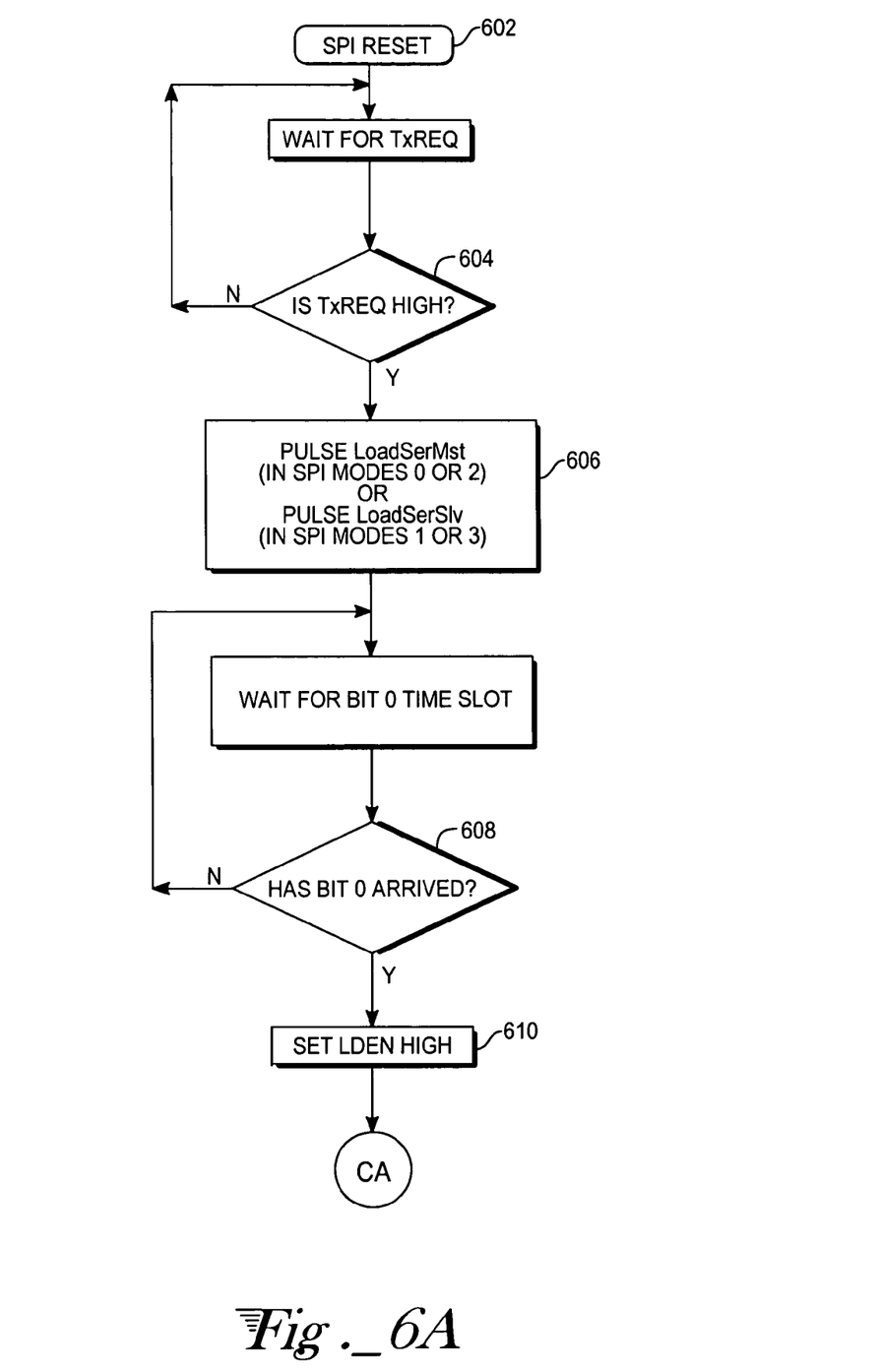
FIGS. 6A–6C illustrate a flow chart of the control finite state machine (FSM) that provides command control signals to the serial peripheral interface of the present invention and communicates with the overall system environment in which the invention is present.
Figure 6B:
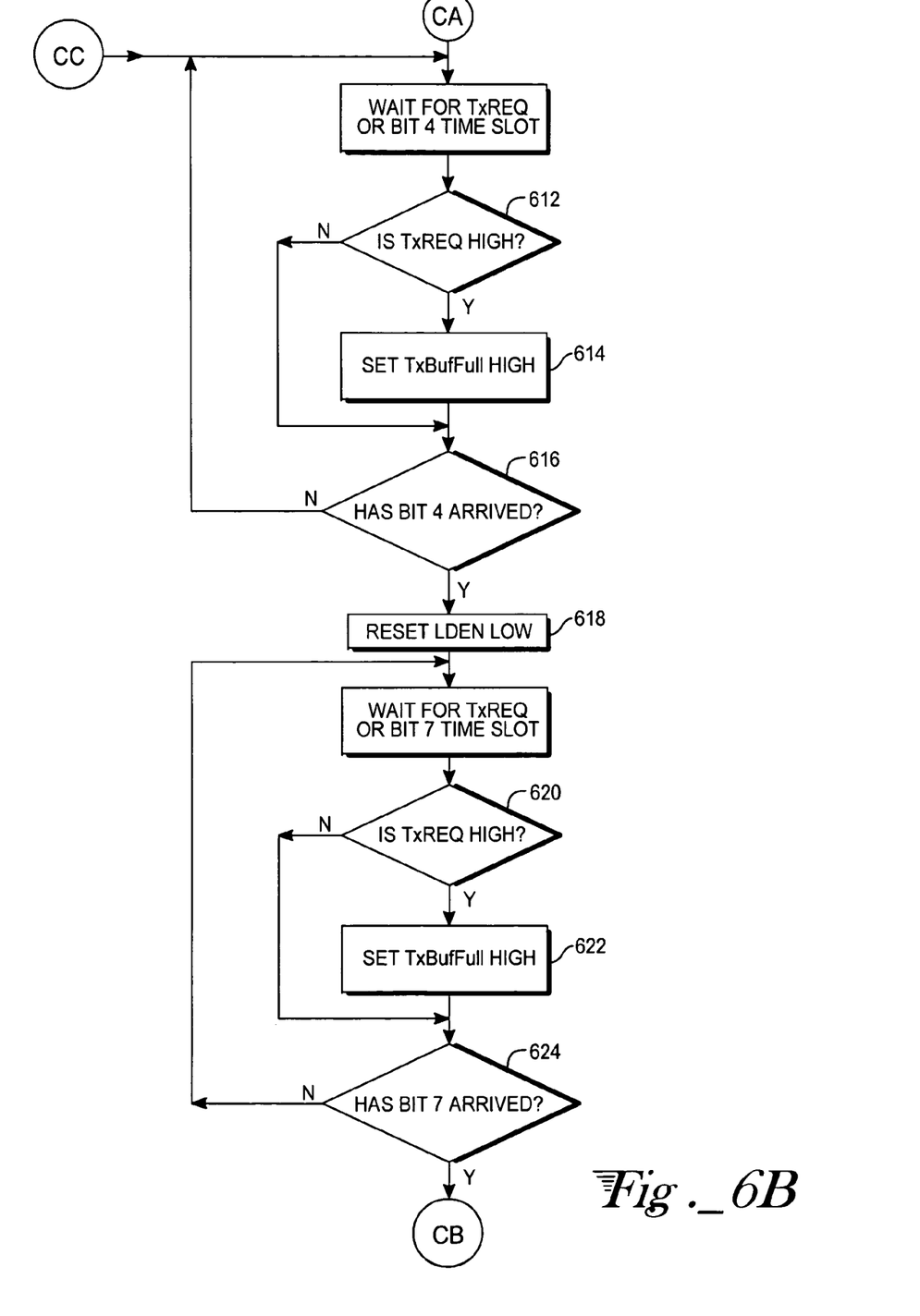
Figure 6C:
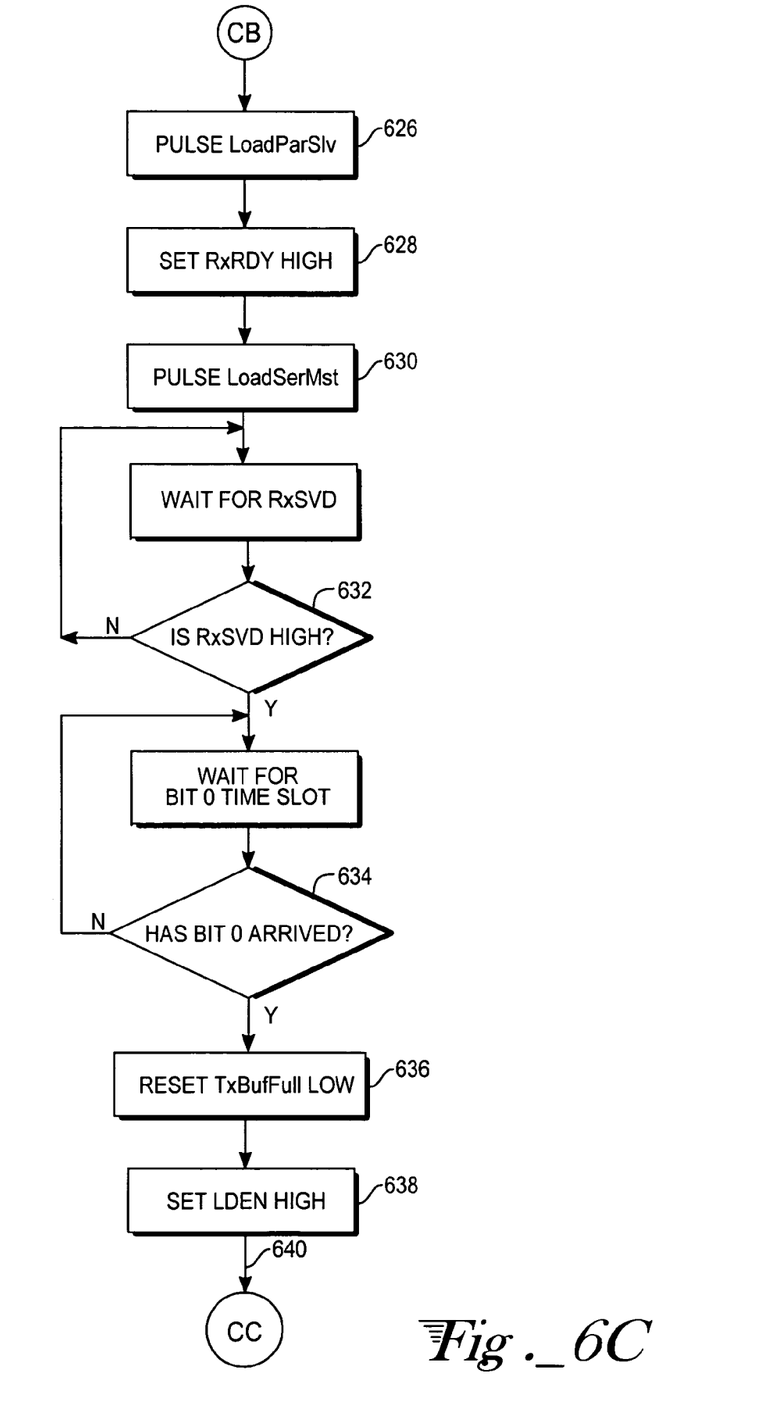

FIGS. 6A–6C present the control FSM flow chart. The finite state machine controller's (260 in FIG. 2B) operation begins when the SPI is reset (step 602). It then waits for a transmission request signal TxREQ, checking repeatedly (step 604) until it is set high. Then, the FSM controller 260 issues either a LoadSerMst pulse or a LoadSerSlv pulse, depending on the SPI mode (step 606). The serial master register 202 is loaded in SPI modes 0 and 2 (used when parallel output through the DataOutBus 232 is desired), while the serial slave register 210 is loaded in SPI modes 1 and 3 (used when serial output through SerialOut line 216 is desired).

The FSM controller 260 then waits until the Bit 0 time slot has arrived (step 608). The bit counter 270 in FIG. 2B serves as a slave to the FSM controller 260. Once the Bit 0 time slot has arrived, the load enable signal LDEN is set high (step 610). Then the FSM controller 260 waits for both TxREQ to be high and the arrival of the Bit 4 time slot (steps 612 and 616). When TxREQ is high, the controller 260 sets TxBufFull to high (step 614). When the Bit 4 time slot arrives, the controller 260 resets LDEN to low (step 618). The controller 260 then waits again for both TxREQ to be high and for the Bit 7 time slot (steps 620 and 624). When TxREQ is high, the controller 260 again sets TxBufFull to high (step 622). When the Bit 7 time slot arrives, flow proceeds to a LoadParSlv pulse (step 626). Note that for the Bit 7 time slot a transmission request (TxREQ low) is not acceptable. Even if the CPU had sampled LDEN as high toward the end of the Bit 3 time slot (just before LDEN was reset to low in Bit slot 4), the CPU should have had plenty of time (3 bit time slots) to issue its TxREQ.

The LoadParSlv pulse (step 626) saves the received byte in the parallel output buffer 230. Then the receive ready signal RxRDY is set high (step 628) and a LoadSerMst pulse is issued (in all SPI modes, because the master clock MCK is still low) (step 630). The controller 260 then waits for a RxSVD signal from the CPU (step 632). After RxSVD has gone high, the controller 260 waits for the Bit 0 time slot to again arrive (step 634). During the bit 0 time slot, the signal TxBufFull is reset low and LDEN is set high (steps 636 and 638).

The state machine 260 is stopped only by an SPI reset which occurs at the end of transmission. Until then, the controller's flow returns (step 640) to waiting for a high TxREQ and the bit 4 time slot, repeating the latter steps in the flow until all bytes have been transmitted.

Although an exemplary embodiment has been specifically described, one skilled in the art will recognize that certain changes and substitutions can be made that are still within a scope of the present invention. For example, the second parallel write buffer 250 is shown implementing a D-type latch. A skilled artisan will realize that other types of a latch may be used.

Yet in another example, the finite state machine controller 260 used in the preferred embodiment of the present invention can be substituted by a programmable logic array (PLA) or a microprocessor without altering the essence of the present invention.

What is claimed is:

1. A serial peripheral interface apparatus, comprising:
   a plurality of serial data-transfer means coupled together for transferring data serially;
   a parallel data-transfer means serving as a parallel slave, the parallel data-transfer means coupled to an output of one of said plurality of serial data-transfer means;
   a buffer means coupled to said plurality of serial data-transfer means for storing a subsequent data byte to be transferred;
   a counter means coupled to said buffer means and said plurality of serial data-transfer means for checking a status of a data transmission within said serial peripheral interface apparatus; and
   a control means coupled to said buffer means, said counter means, and said plurality of serial data transferring means for controlling said data transmission within said serial peripheral interface apparatus and for enabling a loading of said subsequent data byte into said buffer means by said control means reviewing a status of said counter means and a status of said buffer means.

2. The serial peripheral interface apparatus of claim 1, wherein said plurality of serial data-transfer means further comprises a first serial data-transfer means serving as a serial master with an output coupled to a second serial data-transfer means serving as a serial slave.

3. The serial peripheral interface apparatus of claim 2, wherein said first serial data-transfer means further comprises a multiplexer means coupled to a latching means.

4. The serial peripheral interface apparatus of claim 2, wherein said second serial data-transfer means further comprises a multiplexer means coupled to a latching means.

5. The serial peripheral interface apparatus of claim 1, wherein said parallel data-transfer means further comprises a latching means.

6. The serial peripheral interface apparatus of claim 1, wherein said control means further controls a loading of said subsequent data byte to said plurality of serial data-transfer means.

7. The serial peripheral interface apparatus of claim 1, wherein the control means is responsive to the status of the counter means for permitting loading of data bytes into said buffer means only until a time slot in which a fourth bit of a present data byte is transferred.

8. A serial peripheral interface apparatus, comprising:
   a plurality of shift registers coupled together for transferring data serially;
   a parallel slave shift register coupled to an output of one of said plurality of shift registers;
   a write buffer coupled to said plurality of shift registers;
   a bit counter coupled to said plurality of shift registers for keeping track of a bit field of a data byte being transferred through said apparatus; and
   a finite state machine controller coupled to said apparatus for controlling data transmission therethrough and for enabling a loading of a subsequent data byte into said write buffer by checking a status of said bit counter and a status of said write buffer.

9. The apparatus of claim 8, wherein said plurality of shift registers further comprises a serial master shift register and a serial slave shift register coupled to an output of said serial master shift register for transferring data serially.

10. The serial peripheral interface apparatus of claim 9, wherein said serial master shift register further comprises a multiplexer coupled to a clocked flip-flop.

11. The serial peripheral interface apparatus of claim 9, wherein said serial slave shift register further comprises a multiplexer coupled to a clocked flip-flop.

12. The serial peripheral interface apparatus of claim 8, wherein said parallel slave shift register further comprises a clocked flip-flop.

13. The serial peripheral interface apparatus of claim 9, wherein said finite state machine controller further controls a loading of said data byte to said plurality of shift registers.

14. The serial peripheral interface apparatus of claim 9 wherein the finite state machine controller is responsive to a status of the bit counter so as to permit loading of a subsequent data byte into the write buffer only until a time slot in which a fourth bit of a present data byte is transferred.

15. A microcontroller comprising:
   a central processing unit;
   a bus interface coupled to said central processing unit;

a memory module coupled to and in communication with said central processing unit via said bus interface;

a serial peripheral interface module coupled to said memory module and said bus interface; said serial peripheral interface further comprising:

a serial master shift register, a serial slave shift register coupled to an output of said serial master shift register for transferring data serially, and a parallel slave shift register coupled to said output of said serial master shift register;

a write buffer coupled to an input of said serial slave shift register;

a bit counter coupled to said serial peripheral interface module for keeping track of a data set being transferred therethrough; and a finite state machine controller coupled to said serial peripheral interface module for controlling data transmission therethrough and for enabling a loading of a subsequent data byte into said write buffer by providing the status of said bit counter and a status of said write buffer back to said central processing unit.

* * * * *